United States Patent
Saito

(10) Patent No.: US 10,284,745 B2
(45) Date of Patent: *May 7, 2019

(54) MANAGEMENT SYSTEM INCLUDING COMMUNICATION INTERFACE AND CONTROLLER

(71) Applicant: BROTHER KOGYO KABUSHIKI KAISHA, Nagoya, Aichi (JP)

(72) Inventor: Ken Saito, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/021,672

(22) Filed: Jun. 28, 2018

(65) Prior Publication Data

US 2018/0309897 A1 Oct. 25, 2018

Related U.S. Application Data

(63) Continuation of application No. 15/336,175, filed on Oct. 27, 2016, now Pat. No. 10,033,902.

(30) Foreign Application Priority Data

Oct. 30, 2015 (JP) .................................. 2015-213916

(51) Int. Cl.
*H04N 1/32* (2006.01)
*H04N 1/00* (2006.01)

(52) U.S. Cl.
CPC ..... *H04N 1/32101* (2013.01); *H04N 1/00307* (2013.01); *H04N 1/00344* (2013.01);
(Continued)

(58) Field of Classification Search
CPC combination set(s) only.
See application file for complete search history.

(56) References Cited

U.S. PATENT DOCUMENTS

| 6,970,263 B2 * | 11/2005 | Suzuki | H04L 67/02 358/1.15 |
| 9,451,432 B2 * | 9/2016 | Arai | H04N 1/00127 |

(Continued)

FOREIGN PATENT DOCUMENTS

| JP | 2002-032205 A | 1/2002 |
| JP | 2010-282624 A | 12/2010 |

(Continued)

OTHER PUBLICATIONS

Official Action dated Jun. 14, 2018 from related docket U.S. Appl. No. 15/716,814.

(Continued)

*Primary Examiner* — Ibrahim Siddo
(74) *Attorney, Agent, or Firm* — Scully, Scott, Murphy & Presser, PC

(57) ABSTRACT

A controller in a management system performs: in response to receiving a first request, transmitting first information to an image-processing apparatus, the transmitted first information being acquired by a terminal apparatus; receiving the first information acquired by the terminal apparatus and original image data stored in the terminal apparatus; storing the received original image data at a first storage location in the image data storage, the first storage location being specified by the received first information; receiving a second request; in response to receiving the second request, transmitting the second information to the image-processing apparatus; receiving the second information and a third request from the image-processing apparatus; and in response to receiving the third request; transmitting target image data based on the received original image data to the image-processing apparatus, the target image data being stored in the second storage location specified by the received second information.

16 Claims, 9 Drawing Sheets

(52) U.S. Cl.
CPC ... *H04N 1/32358* (2013.01); *H04N 2201/006* (2013.01); *H04N 2201/0094* (2013.01)

(56) References Cited

U.S. PATENT DOCUMENTS

| | | |
|---|---|---|
| 2005/0270569 A1 | 12/2005 | Hayashi |
| 2007/0229891 A1 | 10/2007 | Yanagi et al. |
| 2008/0033955 A1* | 2/2008 | Fujii .................. G06F 21/6218 |
| 2010/0309503 A1 | 12/2010 | Partridge et al. |
| 2012/0026536 A1 | 2/2012 | Shah |
| 2012/0110065 A1 | 5/2012 | Oshima et al. |
| 2013/0086638 A1 | 4/2013 | Itogawa et al. |
| 2014/0132981 A1 | 5/2014 | Song et al. |
| 2017/0126926 A1 | 5/2017 | Saito |

FOREIGN PATENT DOCUMENTS

| | | |
|---|---|---|
| JP | 2013-080300 A | 5/2013 |
| JP | 2013-156952 A | 8/2013 |
| JP | 2017-084217 A | 5/2017 |

OTHER PUBLICATIONS

U.S. Appl. No. 15/716,814, filed Sep. 27, 2017.
U.S. Appl. No. 15/912,787, filed Mar. 6, 2018.
Corrected Notice of Allowability dated Jun. 25, 2018 from related docket U.S. Appl. No. 15/336,175.
Notice of Allowance dated Mar. 16, 2018 from related docket U.S. Appl. No. 15/336,175.

* cited by examiner

FIG. 5A
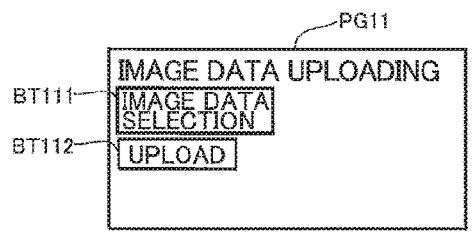
FIG. 5B
FIG. 5E
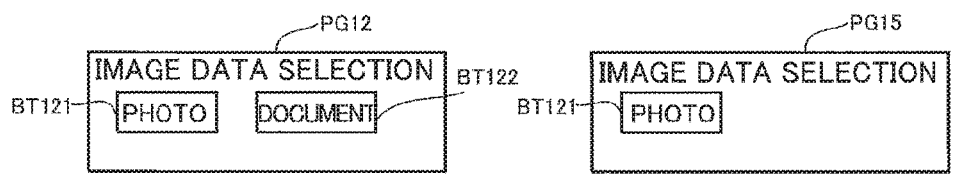
FIG. 5C
FIG. 5F
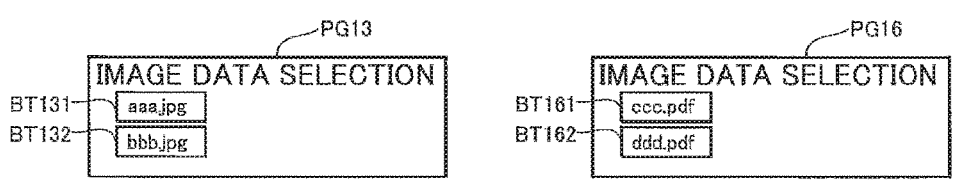
FIG. 5D
FIG. 5G
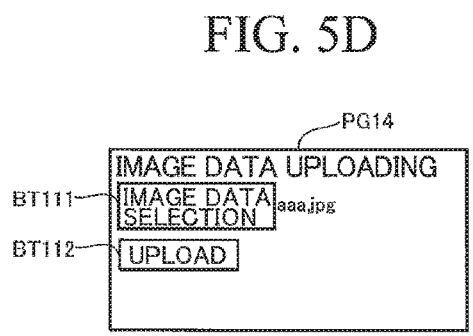
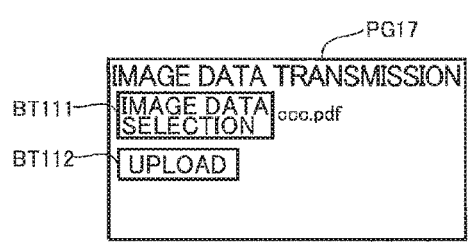

FIG. 6A

UPLOAD DESTINATION (URL1)
https://xxx/yyy/?jid=001

DOWNLOAD SOURCE (URL1)
https://xxx/yyy/?jid=001

FIG. 6B

UPLOAD DESTINATION (URL2)
https://xxx/yyy/?jid=002

DOWNLOAD SOURCE (URL3)
https://xxx/yyy/?jid=003

TRANSMISSION OF IMAGE DATA
HAS BEEN COMPLETED.
PLEASE OPERATE PRINTER
TO PRINT.

MANAGEMENT SYSTEM INCLUDING COMMUNICATION INTERFACE AND CONTROLLER

CROSS REFERENCE TO RELATED APPLICATION

This application is a continuation of U.S. Ser. No. 15/336,175, filed Oct. 27, 2016 which claims priority from Japanese Patent Application No. 2015-213916 filed Oct. 30, 2015. The entire content of the priority application is incorporated herein by reference.

TECHNICAL FIELD

The present disclosure relates to a management system, an image-processing apparatus, and a computer program for transmitting to the image-processing apparatus an image data received from a terminal apparatus.

BACKGROUND

Japanese Patent Application Publication No. 2010-282624 discloses a technology which controls a printer to print a document received from a portable device. The printer displays an optical code according to an optical code stored on the printer itself. The portable device captures an image of the optical code displayed on the printer and transmits this code together with the document to a server. The server transmits the document to the corresponding printer based on the optical code, and the printer prints the document received from the server.

SUMMARY

In the conventional technology described above, the printer already stores a printer-specific optical code. However, if the printer does not store an optical code, the portable device cannot capture an image of the optical code and, hence, cannot transmit the optical code to the server. Consequently, the server cannot determine the printer to which the document should be transmitted. Hence, printers that do not store an optical code cannot receive documents transmitted from portable devices and, thus, cannot print such documents.

In view of the foregoing, it is an object of the present disclosure to provide a technology in which an image-processing apparatus can process an image based on image data transmitted from a terminal apparatus to a management system, even when the image-processing apparatus does not store apparatus-specific information identifying the image-processing apparatus itself.

In order to attain the above and other objects, the disclosure provides a management system capable of communicating with both an image-processing apparatus and a terminal apparatus. The management system includes a communication interface and a controller. The controller is configured to perform: receiving a first request from the image-processing apparatus through the communication interface, the first request requesting to transmit first information to the image-processing apparatus, the first information specifying a first storage location in an image data storage, the first storage location being for storing original image data; in response to receiving the first request, transmitting the first information to the image-processing apparatus through the communication interface, the transmitted first information being acquired by the terminal apparatus; receiving the first information acquired by the terminal apparatus and the original image data stored in the terminal apparatus from the terminal apparatus through the communication interface; storing the received original image data at the first storage location in the image data storage, the first storage location being specified by the received first information; receiving a second request from the image-processing apparatus through the communication interface, the second request requesting to transmit second information to the image-processing apparatus, the second information specifying a second storage location in the image data storage, the second storage location being for storing target image data, the target image data being based on the received original image data; in response to receiving the second request, transmitting the second information to the image-processing apparatus through the communication interface; receiving the second information and a third request from the image-processing apparatus through the communication interface, the third request requesting to transmit to the image-processing apparatus the target image data stored at the second storage location specified by the received second information; and in response to receiving the third request, transmitting the target image data to the image-processing apparatus through the communication interface.

According to another aspect, an image-processing apparatus capable of communicating with both a management system and a terminal apparatus. The image-processing apparatus includes a communication interface and a controller. The controller is configured to perform: transmitting a first request to the management system through the communication interface, the first request requesting to transmit first information, the first information specifying a first storage location in an image data storage, the first storage location being for storing original image data; receiving the first information from the management system through the communication interface; placing the received first information in a state where the terminal apparatus is capable of acquiring the received first information; transmitting a second request to the management system through the communication interface, the second request requesting to transmit second information, the second information specifying a second storage location in the image data storage, the second storage location being for storing target image data, the target image data being based on the original image data transmitted from the terminal apparatus to the management system; receiving the second information from the management system through the communication interface; transmitting a third request to the management system through the communication interface using the received second information, the third request requesting to transmit the target image data stored in the second storage location specified by the received second information; and receiving the target image data from the management system through the communication interface.

According to another aspect, a non-transitory computer readable storage medium storing a set of program instructions for an image-processing apparatus. The image-processing apparatus is capable of communicating with both a management system and a terminal apparatus. The image-processing apparatus includes a communication interface and a controller. The set of program instructions, when executed by the controller, causes the controller to perform: transmitting a first request to the management system through the communication interface, the first request requesting to transmit first information, the first information specifying a first storage location in an image data storage, the first storage location being for storing original image data; receiving the first information from the management system through the communication interface; placing the received first information in a state where the terminal apparatus is capable of acquiring the received first information; transmitting a second request to the management system through the communication interface, the second request requesting to transmit second information, the second information specifying a second storage location in the image data storage, the second storage location being for storing target image data, the target image data being based on the original image data transmitted from the terminal apparatus to the management system; receiving the second information from the management system through the communication interface; transmitting a third request to the management system through the communication interface using the received second information, the third request requesting to transmit the target image data stored in the second storage location specified by the received second information; and receiving the target image data from the management system through the communication interface.

BRIEF DESCRIPTION OF THE DRAWINGS

The particular features and advantages of the embodiment(s) as well as other objects will become apparent from the following description taken in connection with the accompanying drawings, in which:

FIGS. 5A through 5G are explanatory diagrams illustrating the upload pages used in the first through third embodiments;

FIG. 6A is an explanatory diagram illustrating URLs used in the first embodiment and the third embodiment;

FIG. 6B is an explanatory diagram illustrating URLs used in the second embodiment;

FIG. 7 is an explanatory diagram illustrating an upload completed page used in the first through third embodiments;

DETAILED DESCRIPTION

[First Embodiment]

Figure 1:
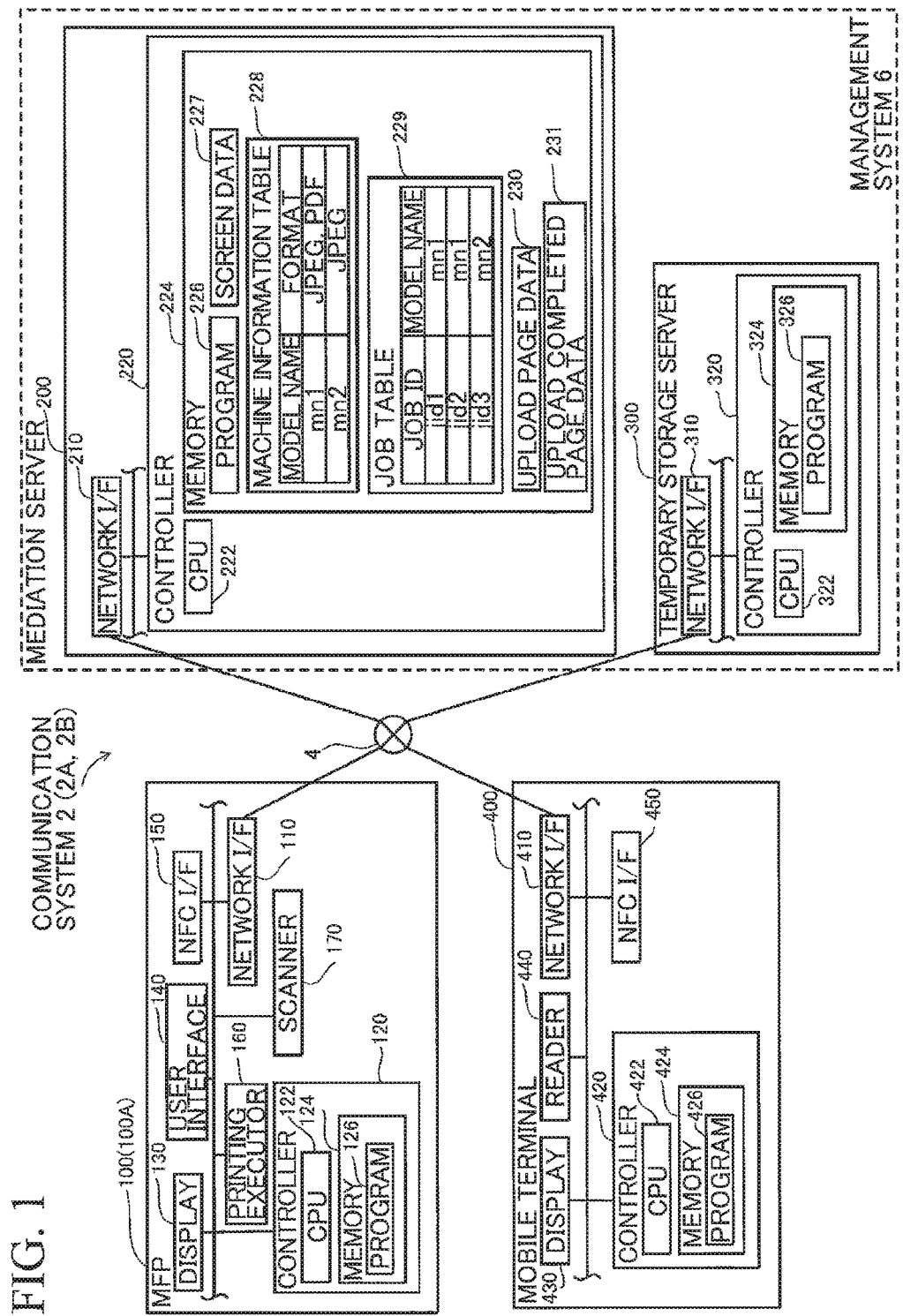
FIG. 1 is a schematic diagram of a communication system according to a first embodiment.

FIG. 1 is a schematic diagram of a communication system 2. The communication system 2 includes a multifunction peripheral (MFP) 100, a mobile terminal 400 such as a smartphone or a tablet, and a management system 6. The management system 6 includes a mediation server 200, and a temporary storage server 300. The MFP 100, the mediation server 200, the temporary storage server 300, and the mobile terminal 400 can communicate with each other through the Internet 4. The MFP 100 and the mobile terminal 400 can also communicate with each other using Near Field Communication (NFC), which is a short-range wireless communication standard. Data transfer and exchange with NFC is easily achieved since communication can be established by simply bringing one device near the other. The MFP 100 is an example of an "image-processing apparatus". The mobile terminal 400 is an example of a "terminal apparatus". The management system 6 is an example of a "management system". The mediation server 200 is an example of a "first management apparatus". The temporary storage server 300 is an example of a "second management apparatus".

The MFP 100 belongs to a local area network (hereinafter abbreviated as LAN) at the home, hotel, or other location in which the MFP 100 is deployed. Thus, the MFP 100 communicates with the mediation server 200, the temporary storage server 300, and the mobile terminal 400 via the LAN and the Internet 4.

The mobile terminal 400 uses Long Term Evolution (hereinafter abbreviated as LTE) to communicate with the MFP 100, the mediation server 200, and the temporary storage server 300 over the Internet 4. The LTE is a wireless communication protocol conforming to a communication standard developed by the 3rd Generation Partnership Project (3GPP).

[Structure of the MFP 100]

The MFP 100 includes a network interface 110, a controller 120, a display 130, a user interface 140, an NFC interface 150, a printing executor 160, and a scanner 170. The network interface 110 is an interface for transmitting and receiving signals over a network such as the LAN or the Internet. The NFC interface 150 is an interface for transmitting and receiving signals according to NFC. The network interface 110 is an example of a "communication interface".

The controller 120 includes a CPU 122, and a memory 124. The memory 124 stores a program 126. The memory 124 may be configured of RAM, ROM, or a hard disk drive, for example. The CPU 122 executes various processes according to the program 126 stored in the memory 124. The memory 124 is an example of a "non-transitory computer readable storage medium". The program 126 is an example of a "set of program instructions".

The display 130 functions to display various information. The user interface 140 includes a plurality of keys. By operating the user interface 140, the user can input various commands into the MFP 100. Here, the display 130 functions as a touchscreen for receiving user operations. In other words, the display 130 functions as a user interface on which the user performs operations. The printing executor 160 executes processes for printing data acquired from external sources. The scanner 170 executes processes for scanning originals placed in the scanner 170.

[Structure of the Mediation Server 200]

The mediation server 200 includes a network interface 210, and a controller 220. The network interface 210 is an interface for transmitting and receiving signals over a network such as the Internet. The network interface 210 is an example of a "communication interface" and is also an example of a "first communication interface".

The controller 220 includes a CPU 222, and a memory 224. The memory 224 stores a program 226, screen data 227, a machine information table 228, a job table 229, upload page data 230, and upload completed page data 231. The memory 224 may be configured of RAM, ROM, or a hard disk drive, for example. The CPU 222 executes various processes according to the program 226 stored in the memory 224. The screen data 227 is information for screens displayed on the display 130 of the MFP 100. When the mediation server 200 transmits the screen data 227 to the MFP 100, the MFP 100 can display screens based on the screen data 227 on the display 130. The controller 220 is an example of a "first controller". The memory 224 is an example of a "table storage". The machine information table 228 is an example of a "table". The upload page data 230 is an example of "fifth information".

The machine information table 228 stores various model names and formats. Here, the model names indicate all types of MFPs that the vendor of the mediation server 200 has provided. Formats specify the formats of image data that these MFPs can interpret. Each time the vendor provides a new type of MFP, the model name of the MFP and the supported data formats are added to the machine information table 228. In the example of FIG. 1, two records of machine information have been stored in the machine information table 228.

The job table 229 is a table for storing job IDs and model names. A job ID is identification information that identifies image data stored in a memory 324 of the temporary storage server 300 described later and identification information that identifies the storage location of the image data in the memory 324. In the example of FIG. 1, three jobs are currently recorded in the job table 229. The memory 324 is an example of an "image data storage".

The upload page data 230 is page data for the mobile terminal 400 uploading image data. The act of uploading in this case is a process of storing image data in the memory 324 of the temporary storage server 300 described later. Thus, the upload page data 230 is page data required for storing image data in the memory 324. The upload completed page data 231 is page data transmitted to the mobile terminal 400 in response to image data received from the mobile terminal 400 being stored in the memory 324.

[Structure of the Temporary Storage Server 300]

The temporary storage server 300 includes a network interface 310, and a controller 320. The network interface 310 is an interface for transmitting and receiving signals via a network such as the Internet. The controller 320 is an example of a "second controller". The network interface 310 is an example of a "communication interface" and is also an example of a "second communication interface".

The controller 320 includes a CPU 322, and the memory 324. The memory 324 stores a program 326. The memory 324 may be configured of RAM, ROM, or a hard disk drive, for example. The CPU 322 executes various processes according to the program 326 stored in the memory 324.

[Structure of the Mobile Device 400]

The mobile terminal 400 includes a network interface 410, a controller 420, a display 430, a reader 440, and a NFC interface 450. The network interface 410 is an interface for transmitting and receiving signals over a network using LTE. The NFC interface 450 is an interface for transmitting and receiving signals using NFC.

The controller 420 includes a CPU 422, and a memory 424. The memory 424 stores a program 426. The memory 424 is configured of RAM, ROM, or a hard disk drive, for example. The CPU 422 executes various processes according to the program 426.

The display 430 functions to display various information. The display 430 also functions as a touchscreen for accepting user operations. In other words, the display 430 functions as a user interface on which the user can perform operations. The reader 440 is a camera that can read a code image of a QR code (registered trademark). The mobile terminal 400 can acquire information included in the QR code by using the reader 440 to read the code image.

[Operations of the Communication System 2]

Figure 2:
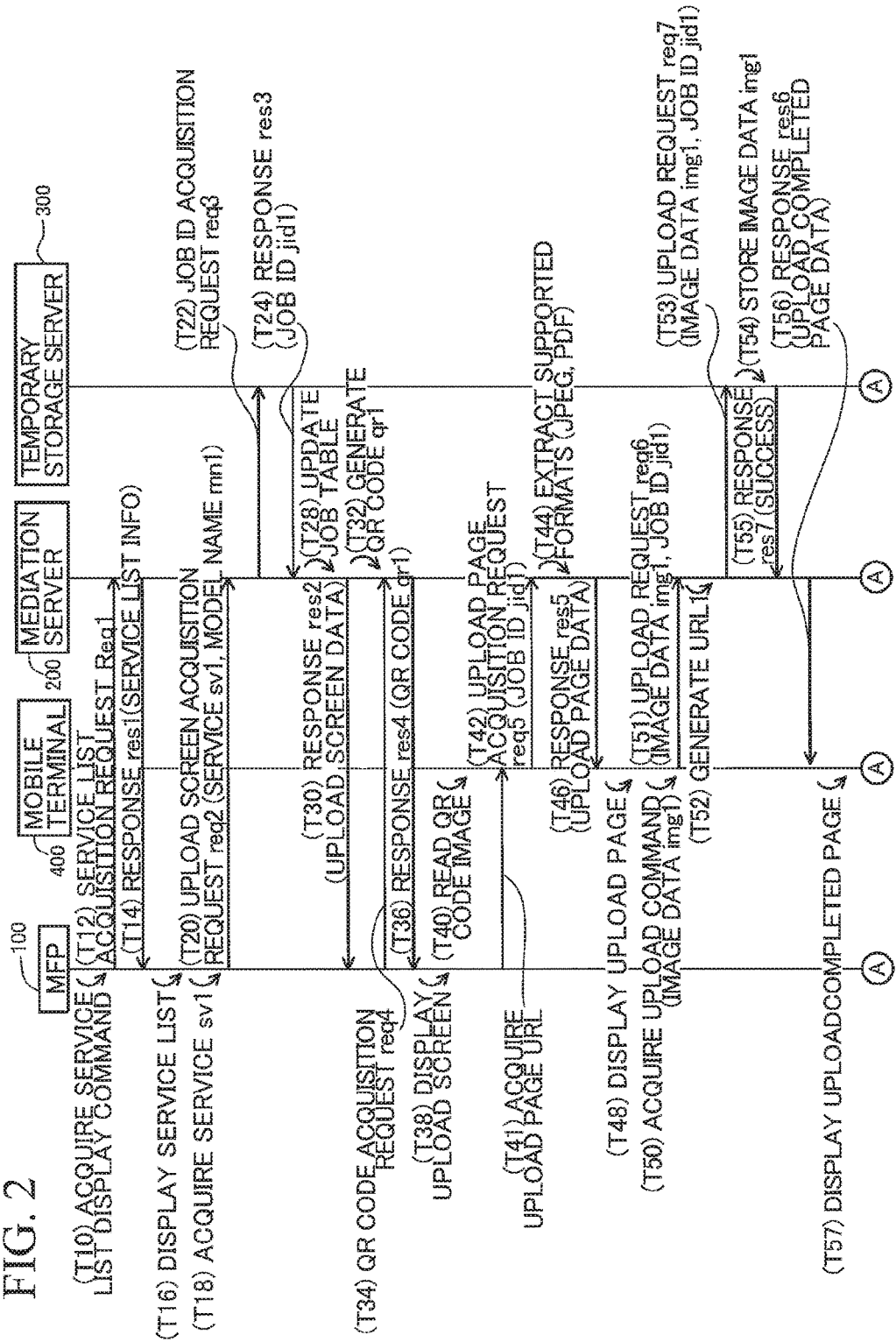
FIG. 2 is a sequence chart illustrating steps in processes performed on the communication system according to the first embodiment.
Figure 3:
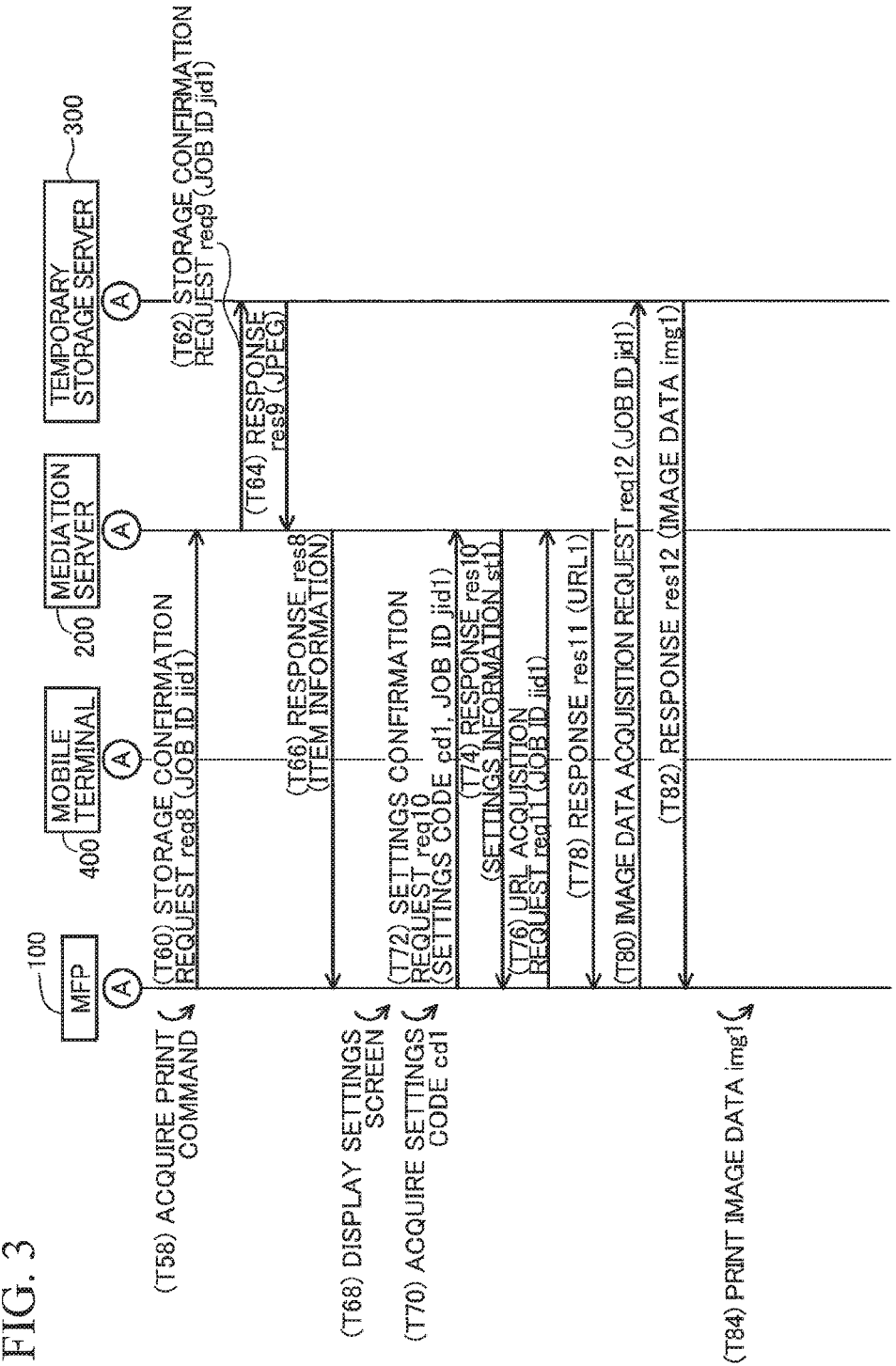
FIG. 3 is a sequence chart illustrating steps in processes performed on the communication system according to the first embodiment.

Next, processes performed on the communication system 2 according to the first embodiment will be described with reference to FIGS. 2 and 3. FIGS. 2 and 3 are sequence charts illustrating steps in the processes performed on the communication system 2.

In T10 of FIG. 2, first the MFP 100 receives a service list display command from the user. Specifically, while referring to a screen already displayed on the display 130, the user performs operations on the user interface 140 of the MFP 100 to select a button displayed in the screen instructing the MFP 100 to display a list of services available to the MFP 100.

In T12 the MFP 100 transmits a service list acquisition request req1 to the mediation server 200 in response to the service list display command. The service list acquisition request req1 is a request to acquire service list information indicating the list of services available to the MFP 100.

In T14 the mediation server 200 transmits a response res1 to the MFP 100. The response res1 includes the service list information. The service list information is information indicating the list of services available to the MFP 100, and information for accepting, via the user interface 140, a selection for a service that the user wishes to use.

In T16 the MFP 100 displays a service list screen on the display 130 based on the service list information.

In T18 the MFP 100 receives a selection from the user for a service. Specifically, the user operates the user interface 140 to select a desired service in the service list screen displayed on the display 130. In the present embodiment, the user selects a printing service in which the MFP 100 prints image data based on user's designation on the mobile terminal 400. From this selection, the MFP 100 acquires the identification information "service sv1" identifying the printing service. Note that, in the present embodiment, it will be assumed that the user wishes to print image data img1 already stored in the memory 424 of the mobile terminal 400 and intends to designate the image data img1 on the mobile terminal 400.

In T20 the MFP 100 transmits an upload screen acquisition request req2 to the mediation server 200. The upload screen acquisition request req2 is a request to acquire upload screen data indicating an upload screen SC1 required for using the printing service selected in T18. The upload screen acquisition request req2 includes the service sv1, and the model name of the MFP 100. In the present embodiment, the model name of the MFP 100 is "mn1". The upload screen acquisition request req2 is an example of a "first request". The model name mn1 is an example of "third information".

In T22 the mediation server 200 transmits a job ID acquisition request req3 to the temporary storage server 300. The job ID acquisition request req3 is a request to acquire a job ID used for generating a URL1. The URL1 specifies a storage location in the memory 324 of the temporary storage server 300 for storing the image data img1. The method of generating the URL1 will be described later.

In T24 the temporary storage server 300 transmits a response res3 to the mediation server 200 in response to the job ID acquisition request req3. The response res3 includes the job ID jid1. The job ID jid1 is identification information identifying the image data img1, and identification information for identifying the storage location in the memory 324 of the temporary storage server 300 for storing the image data img1. The job ID jid1 may be "001", for example. The job ID jid1 is an example of "first information". The image data img1 is an example of "original image data".

In T28 the mediation server 200 updates the job table 229. Specifically, the mediation server 200 stores the model name mn1 received in T20 in the job table 229 in association with the job ID jid1 received in T24.

In T30 the mediation server 200 transmits a response res2 to the MFP 100 in response to the upload screen acquisition request req2. The response res2 includes the upload screen data indicating the upload screen SC1. The upload screen data includes a confirmation URL that the MFP 100 will need in order to transmit a storage confirmation request req8 to the mediation server 200 in T60 described later, a QR code URL specifying the storage location in which a QR code qr1 is to be stored, and codes for displaying a code image QRIMG1, a message MS1, and a button BT1. The job ID jid1 is also included in both the confirmation URL and the QR code URL. Note that the upload screen data does not include the QR code qr1 representing the code image QRIMG1. Therefore, in order to display the code image QRIMG1 in the upload screen SC1, the MFP 100 must acquire the QR code qr1 in a separate step using the QR code URL. The QR code qr1 is an example of "code data". The code image QRIMG1 is an example of a "code image".

In response to transmitting the response res2, in T32 the mediation server 200 generates the QR code qr1 described above and stores the generated QR code qr1 at the storage location, specified by the QR code URL transmitted to the MFP 100, in the memory 224.

In T34 the MFP 100 transmits a QR code acquisition request req4 to the mediation server 200 using the QR code URL received in T30. The QR code acquisition request req4 is a request to acquire the QR code qr1. The QR code acquisition request req4 is an example of a "first request".

In T36 the mediation server 200 transmits a response res4 to the MFP 100. The response res4 includes the QR code qr1. Upon receiving the response res4, the MFP 100 can display the upload screen SC1 including the code image QRIMG1 on the display 130.

In T38 the MFP 100 displays the upload screen SC1 on the display 130.

Figure 4A:
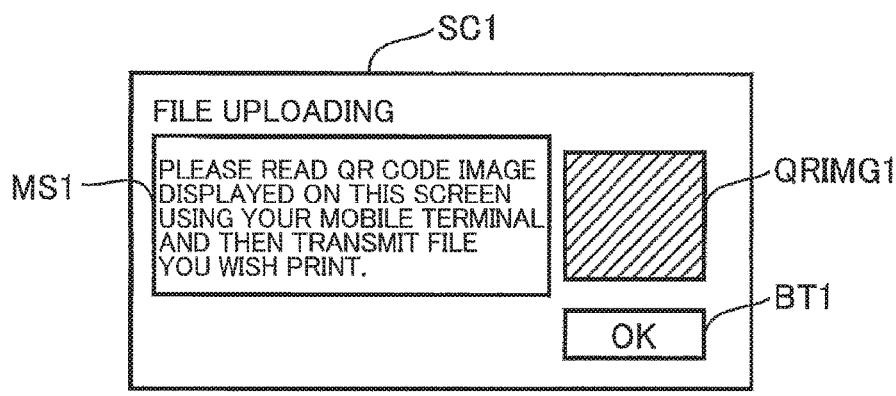
FIG. 4A is an explanatory diagram illustrating an upload screen used in the communication system according to the first embodiment and a communication system according to a second embodiment.
Figure 4B:
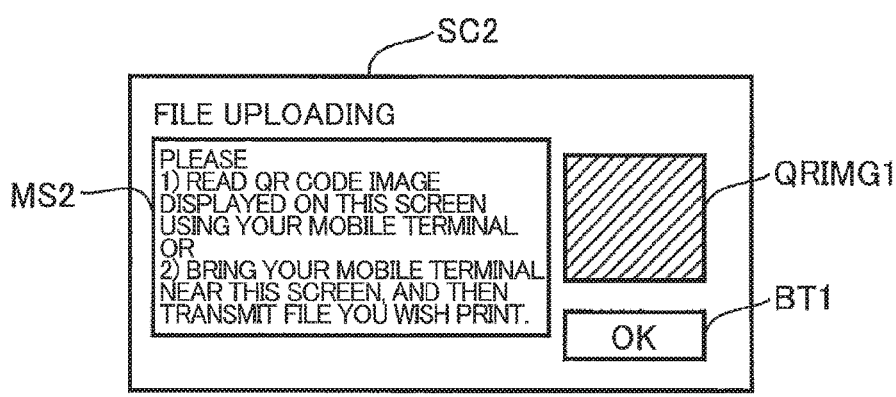
FIG. 4B is an explanatory diagram illustrating an upload screen used in a communication system according to a third embodiment.

FIG. 4 illustrates upload screens SC1 and SC2. The upload screen SC1 illustrated in FIG. 4A is used in the first embodiment and second embodiment (described later). The upload screen SC2 illustrated in FIG. 4B is used in the third embodiment (described later). The upload screen SC1 includes the code image QRIMG1, the message MS1, and the button BT1. The code image QRIMG1 is an image representation of the QR code qr1. The QR code qr1 is an encoding of the upload page URL that includes the job ID jid1. The upload page URL specifies a storage location in the memory 224 of the mediation server 200 in which the upload page data 230 is stored.

The message MS1 is a message prompting the user to read the code image QRIMG1 using the mobile terminal 400. By using the mobile terminal 400 to read the code image QRIMG1, the mobile terminal 400 can acquire an upload page URL that includes the job ID jid1. In this way, in T38 the MFP 100 places the upload page URL (including the job ID jid1) in a state where the mobile terminal 400 can acquire the upload page URL (including the job ID jid1). The button BT1 is a button for instructing a printing operation for the image data img1 selected in T50 described later. When the user presses the button BT1, the MFP 100 acquires a print command for printing the selected image data img1 and changes the screen displayed on the display 130 from the upload screen SC1 to the screen that was previously displayed in T10.

In T40 the user reads the code image QRIMG1 in the upload screen SC1 displayed on the display 130 using the reader 440 of the mobile terminal 400. Through this operation, the mobile terminal 400 acquires the QR code qr1.

In T41 the mobile terminal 400 interprets the QR code qr1 to acquire the upload page URL that includes the job ID jid1.

In T42 the mobile terminal 400 transmits an upload page acquisition request req5 to the mediation server 200 using the upload page URL. More specifically, the mobile terminal 400 references the upload page URL to identify the mediation server 200 storing the upload page data 230. The mobile terminal 400 transmits the job ID jid1 to the mediation server 200 identified from the upload page URL. The acquisition request req5 is an example of a "fourth request".

In T44 the mediation server 200 extracts the formats of the image data that the MFP 100 can interpret. Specifically, first the mediation server 200 extracts, from the job table 229, the model name mn1 associated with the job ID jid1 that was included in the upload page acquisition request req5. Next, the mediation server 200 extracts the formats associated with the model name mn1 from the machine information table 228. In this example, formats associated with the model name mn1 are the JPEG and PDF formats. The JPEG format is an example of "fourth information". The PDF format is an example of "fourth information".

In T46 the mediation server 200 transmits a response res5 to the mobile terminal 400 in response to the upload page acquisition request req5. The response res5 includes the upload page data 230 based on the format extracted in T44. The upload page data 230 represents the upload pages illustrated in FIGS. 5A through 5G.

In T48 the mobile terminal 400 displays the initial upload page on the display 430.

FIGS. 5A through 5G illustrate examples of the upload pages. The upload pages are represented by the upload page data 230.

FIG. 5A illustrates a page PG11 that the mobile terminal 400 displays initially. The page PG11 is a page for uploading image data. Displayed in the page PG11 are a button BT111, a button BT112, and the filename for selected image data. However, since image data has not yet been selected in FIG. 5A, the character string "No file selected" is displayed in place of the filename. When the user presses the button BT111, the mobile terminal 400 displays a page PG12 in place of the page PG11. Further, if the user presses the button BT112 after selecting image data, the mobile terminal 400 acquires an upload command for uploading the selected image data. The following description will assume that the user has pressed the button BT111 in the page PG11.

FIG. 5B illustrates the page PG12 displayed in response to the user pressing the button BT111. The page PG12 is a page for selecting the format of the image data. Displayed in the page PG12 are buttons for selecting types of image data corresponding to the formats extracted in T44. In the present embodiment, displayed in the page PG12 are a button BT121 for selecting a photo in the JPEG format in response to the JPEG format being extracted in T44, and a button BT122 for selecting a PDF document in response to the PDF format being extracted in T44. On the other hand, if the MFP can interpret only image data in the JPEG format, the mediation server 200 extracts only the JPEG format in T44. In this case, a page PG15 illustrated in FIG. 5E that includes only the button BT121 would be displayed when the user presses the button BT111 in the page PG11. Once the page PG12 has been displayed, the user presses the button indicating the type of image data that the user wishes to print.

The mobile terminal 400 displays a page PG13 illustrated in FIG. 5C in place of the page PG12 when the user presses the button BT121 and displays a page PG16 illustrated in FIG. 5F in place of the page PG12 when the user presses the button BT122. In the following description, it will be assumed that the user pressed the button BT121 in the page PG12.

FIG. 5C illustrates the page PG13 displayed in response to the user pressing the Photo button BT121. The page PG13 is a page for selecting desired image data of the JPEG format, that is, the page PG13 enables the user to select desired image data of the JPEG format. Buttons are displayed in the page PG13 to indicate all image data files in the JPEG format that are stored in the memory 424. In the present embodiment, it will be assumed that image data img1 having the filename "aaajpg" and image data img11 having the filename "bbb.jpg" are stored in the memory 424. Accordingly, displayed in the page PG13 are a button BT131 indicating the filename of the image data img1, and a button BT132 indicating the filename of the image data img11. The user presses, among the buttons displayed in the page PG13, the button indicating the filename of image data that the user wishes to print.

When the user presses one of the buttons BT131 and BT132, the mobile terminal 400 displays a page PG14 in place of the page PG13. The following description will assume that the user has pressed the button BT131 in the page PG13.

FIG. 5D illustrates the page PG14 displayed in response to the user pressing the button BT131. The page PG14 is a page for transmitting the selected image data. The page PG14 includes the button BT111, the button BT112, and the filename for the selected image data img1 (aaa.jpg). In order to print the image data having the displayed filename, the user presses the button BT112. At this time, the mobile terminal 400 acquires an upload command for uploading the image data img1 in the JPEG format to the temporary storage server 300. In this way, the mediation server 200 can prompt the user to select the image data img1 on the mobile terminal 400 in a format that the MFP 100 can interpret. Here, the user can press the button BT111 in order to change the selected image data. If the user presses the button BT111, the mobile terminal 400 again displays the page PG12 in place of the page PG14.

In response to the user pressing the button BT112 in the page PG14, the mobile terminal 400 acquires the upload command to upload the image data img1 in T50 and transmits an upload request req6 to the mediation server 200 in T51. The upload request req6 is a request transmitted to the mediation server 200 in order to store the image data img1 on the temporary storage server 300. The upload request req6 includes the image data img1, and the job ID jid1.

In T52 the mediation server 200 generates a URL1. As described above, the URL1 specifies a storage location in the memory 324 of the temporary storage server 300 for storing the image data img1.

FIGS. 6A and 6B illustrate examples of URLs. The URLs illustrated in FIG. 6A are used in the first embodiment and the third embodiment (described later), while the URLs illustrated in FIG. 6B are used in the second embodiment (described later). The URL1 is indicated as the upload destination in FIG. 6A. The URL1 includes a parameter xxx identifying the temporary storage server 300, a parameter yyy identifying the memory 324 in the temporary storage server 300, and a parameter jid=001 identifying a storage location in the memory 324 for storing the image data img1. The portion of the URL1 including the character string "https://xxx/yyy/?jid=" is pre-stored on the mediation server 200. Thus, the mediation server 200 generates the URL1 by appending the character string for the job ID jid1 received in T51 (i.e., 001) to the end of the above pre-stored character string.

In T53 the mediation server 200 transmits an upload request req7 to the temporary storage server 300 using the URL1. The upload request req7 includes the image data img1 and the job ID jid1. More specifically, the mediation server 200 references the parameter xxx in the URL1 to identify the temporary storage server 300 to which the image data img1 should be transmitted. The mediation server 200 transmits the parameters yyy and jid=001 and the image data img1 to the temporary storage server 300 identified by the parameter xxx.

In T54 the temporary storage server 300 stores the image data img1. More specifically, the temporary storage server 300 stores the image data img1 at the storage location specified by the parameter jid=001, in the memory 324 specified by the parameter yyy. The storage location at which the image data img1 is stored is an example of a "first storage location" and is also an example of a "second storage location".

In T55 the temporary storage server 300 transmits a response res7 to the mobile terminal 400 in response to the upload request req7. The response res7 includes information indicating that the image data img1 was successfully uploaded to the temporary storage server 300, i.e., that the upload of the image data img1 to the temporary storage server 300 was successful.

Upon receiving the upload successful response (i.e., the response res7) from the temporary storage server 300, in T56 the mediation server 200 transmits a response res6 to the mobile terminal 400 as a response to the upload request req6. The response res6 includes upload completed page data 231.

In T57 the mobile terminal 400 displays an upload completed page PG21 on the display 430.

FIG. 7 illustrates an example of the upload completed page PG21. The upload completed page PG21 is represented by the upload completed page data 231.

In T58 of FIG. 3, the MFP 100 acquires a print command from the user in response to the user pressing the button BT1 in the upload screen SC1 displayed in T38 (see FIG. 4A).

In T60 the MFP 100 transmits a storage confirmation request req8 to the mediation server 200 using the confirmation URL. The storage confirmation request req8 requests the mediation server 200 to confirm whether the temporary storage server 300 stores the image data img1. The storage confirmation request req8 includes the job ID jid1. As described earlier, the job ID jid1 is included in the confirmation URL.

In T62 the mediation server 200 transmits a storage confirmation request req9 to the temporary storage server 300. The storage confirmation request req9 is a request for confirming whether the temporary storage server 300 stores the image data img1. The storage confirmation request req9 includes the job ID jid1 acquired from the storage confirmation request req8. The storage confirmation request req9 is an example of a "fifth request".

In T64 the temporary storage server 300 transmits a response res9 to the mediation server 200 in response to the storage confirmation request req9.

If the image data img1 is not stored on the temporary storage server 300 at the time of receiving the storage confirmation request req9, the response res9 includes information indicating that the image data img1 is not stored on the temporary storage server 300. Note that the user may press the button BT1 at any time after the upload screen SC1 is displayed in T38. Therefore, the process described from T58 to T62 may be executed before the process from T40 to T57 is executed. In such cases, the temporary storage server 300 will receive the storage confirmation request req9 in T62 prior to storing the image data img1 in T54. Hence, the image data img1 may not be stored on the temporary storage server 300 when the storage confirmation request req9 is received.

Upon receiving the response res9 that includes information indicating that an image data img1 is not stored, the mediation server 200 transmits a response res8 indicating that the image data img1 is not stored on the temporary storage server 300 to the MFP 100 as a response to the storage confirmation request req8. Upon receiving this response, the MFP 100 retransmits the storage confirmation request req8 to the mediation server 200 after a fixed interval has elapsed. The fixed interval may be 1 second, for example. In other words, when the image data img1 is not stored on the temporary storage server 300, the MFP 100 continues to transmit the storage confirmation request req8 to the mediation server 200 at fixed intervals until the image data img1 is stored on the temporary storage server 300.

On the other hand, if the image data img1 is stored on the temporary storage server 300 at the time of receiving the storage confirmation request req9, the response res9 includes the filename of the image data img1 (aaa.jpg) identified by the job ID jid1 included in the storage confirmation request req9. Upon receiving the response res9 including the filename of the image data img1 (aaa.jpg), in T66 the mediation server 200 transmits the response res8 to the MFP 100 in response to the storage confirmation request req8. The response res8 includes item information based on the format of the image data img1. The items indicated by the item information are the paper size and color/monochrome setting, for example. Since paper sizes are correlated with each file format, the selectable paper sizes differ according to file format. For example, A4 and letter sizes are correlated with the JPEG format. Therefore, A4 and letter can be selected as the paper size when the format is JPEG.

The mediation server 200 identifies the format of the image data img1 from the extension in the filename (aaa.jpg) included in the response res9. Thus, the mediation server 200 identifies the format of the image data img1 as JPEG since the extension in the filename (aaa.jpg) is "jpg". Hence, in the present embodiment the mediation server 200 transmits a response res8 to the MFP 100 that includes item information for setting the paper size and color/monochrome setting corresponding to the JPEG format.

In T68 the MFP 100 displays a settings screen on the display 130 based on the item information received in T66.

In T70 the MFP 100 accepts user settings for the printing service. Specifically, the user operates the user interface 140 to set the paper size and color/monochrome setting in the settings screen displayed on the display 130. Thus, after the user has uploaded image data using the mobile terminal 400, the user sets the paper size and color/monochrome setting for the printing service using the MFP 100. In the present embodiment, the user selects "A4" as the paper size, and "Color" as the color/monochrome setting. The MFP 100 acquires these settings in the form of a settings code cd1 representing settings information st1 that includes the A4 and color settings.

However, the MFP 100 does not have the capacity to interpret the settings code cd1. Thus, despite acquiring the settings code cd1, the MFP 100 cannot know what settings information to use for printing the image data img1. However, the mediation server 200 can interpret the settings code. Accordingly, the MFP 100 must transmit the settings code cd1 to the mediation server 200 in order to confirm what settings information is to be used for printing the image data img1.

In T72 the MFP 100 transmits a settings confirmation request req10 to the mediation server 200. The settings confirmation request req10 requests that the mediation server 200 confirms the settings information indicated by the settings code cd1. The settings confirmation request req10 includes the settings code cd1 and the job ID jid1.

In T74 the mediation server 200 transmits a response res10 to the MFP 100 in response to the settings confirmation request req10. The response res10 includes the settings information st1 corresponding to the settings code cd1. As described above, the settings information st1 in the present embodiment indicates that the paper size is A4 and the color/monochrome setting is color. Therefore, by receiving the response res10 from the mediation server 200, the MFP 100 can learn that the image data img1 is to be printed in color on A4-size paper.

In T76 the MFP 100 transmits a URL acquisition request req11 to the mediation server 200. The URL acquisition request req11 is a request to acquire, from the mediation server 200, a URL specifying the download source for the image data img1. The URL acquisition request req11 includes the job ID jid1. Since the image data img1 is not converted in this embodiment, the URL specifying the download source for the image data img1 is the URL1, as indicated in FIG. 6A. The URL acquisition request req11 is an example of a "second request". The job ID jid1 is an example of "second information". The URL1 is an example of "second information". The image data img1 is an example of "target image data".

In T78 the mediation server 200 transmits a response res11 to the MFP 100 in response to the URL acquisition request req11. The response res11 includes the URL1.

In T80 the MFP 100 transmits an image data acquisition request req12 to the temporary storage server 300 using the URL1. The image data acquisition request req12 includes the job ID jid1. More specifically, the MFP 100 first identifies the temporary storage server 300 storing the image data img1 by referencing parameter xxx in the URL1. Next, the MFP 100 transmits the parameters yyy and jid=001 to the temporary storage server 300 identified by parameter xxx. The image data acquisition request req12 is an example of a "third request".

In T82 the temporary storage server 300 transmits a response res12 to the MFP 100 in response to the image data acquisition request req12. The response res12 includes the image data img1. Here, the temporary storage server 300 identifies the image data img1 stored in the corresponding storage location of the memory 324 based on the parameters yyy and jid=001 received in T76.

In T84 the MFP 100 prints the image data img1 in color and at A4 size based on the settings information st1.

[Second Embodiment]

In the first embodiment described above, the mobile terminal 400 displays an upload page based on the formats of image data that the MFP 100 can interpret. Accordingly, the user uses the mobile terminal 400 to select image data in a format supported by the MFP 100 and to upload the image data to the temporary storage server 300. In contrast, in the second embodiment, the mobile terminal 400 displays an upload page based on the formats that the temporary storage server 300 can interpret. If the image data selected by the user is in a format that a MFP 100A cannot interpret, the temporary storage server 300 converts the image data to a format supported by the MFP 100A. Hence, in the second embodiment the user can use the mobile terminal 400 to select image data that is not supported by the MFP 100A.

The communication system 2A according to the second embodiment includes the MFP 100A, the mobile terminal 400, and the management system 6. The management system 6 includes the mediation server 200 and the temporary storage server 300. The MFP 100A in the second embodiment has the model name mn2. The remaining structure of the MFP 100A is identical to that of the MFP 100 in the first embodiment. The mediation server 200, the temporary storage server 300, and the mobile terminal 400 in the second embodiment have the same configurations as those in the first embodiment. The model name mn2 is an example of "third information".

[Operations of the Communication System 2A]

Figure 8:
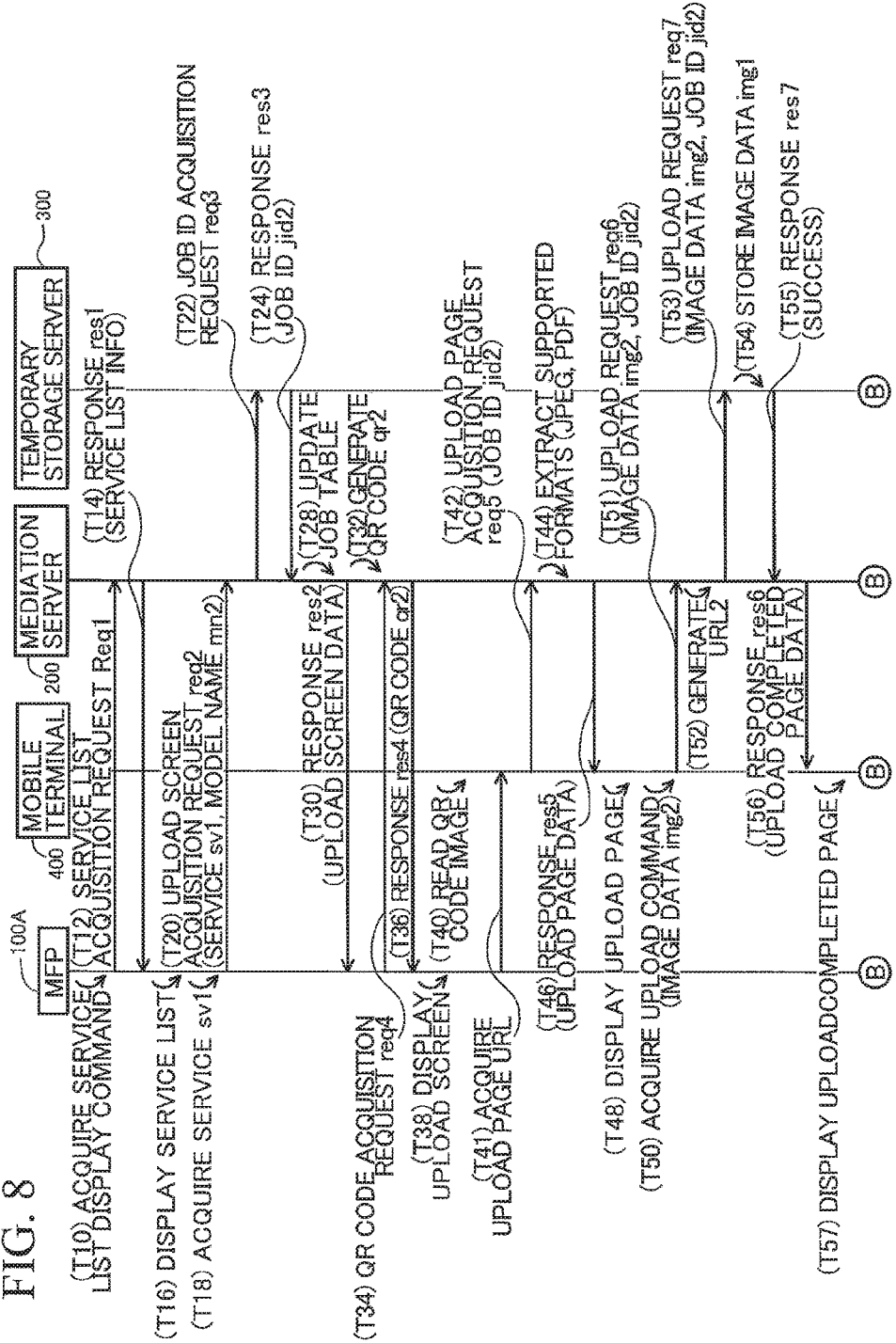
FIG. 8 is a sequence chart illustrating steps in processes performed on the communication system according to the second embodiment.
Figure 9:
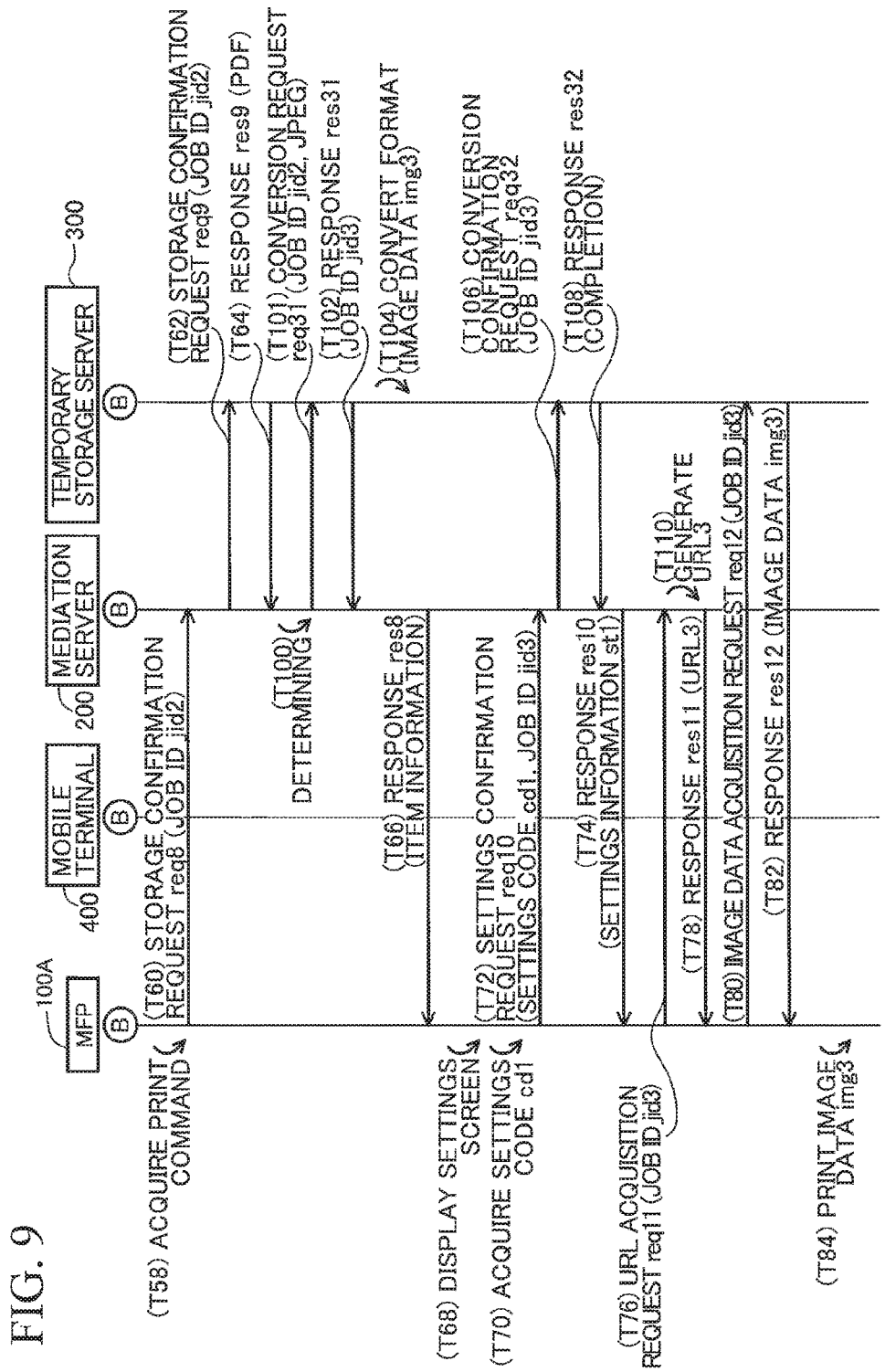
FIG. 9 is a sequence chart illustrating steps in processes performed on the communication system according to the second embodiment.

Next, processes performed on the communication system 2A according to the second embodiment will be described with reference to FIGS. 8 and 9. FIGS. 8 and 9 are sequence charts illustrating steps in the processes performed on the communication system 2A according to the second embodiment.

The process from T10 to T18 is identical to that in the first embodiment and, hence, a description of this process will not be repeated.

In T20 the MFP 100A transmits an upload screen acquisition request req2 to the mediation server 200. The upload screen acquisition request req2 is a request to acquire upload screen data indicating the upload screen SC1 required for using the printing service selected in T18. The upload screen acquisition request req2 includes the service sv1, and the model name "mn2" for the MFP 100A.

In T22 the mediation server 200 transmits a job ID acquisition request req3 to the temporary storage server 300. The job ID acquisition request req3 is a request to acquire a job ID used for generating a URL2. The URL2 specifies a storage location in the memory 324 of the temporary storage server 300 for storing image data img2 received in T52 (described later). The method of generating the URL2 is identical to the method of generating the URL1 described in the first embodiment.

In T24 the temporary storage server 300 transmits a response res3 to the mediation server 200 in response to the job ID acquisition request req3. The response res3 includes a job ID jid2. The job ID jid2 is identification information identifying the image data img2, and identification information for identifying the storage location in the memory 324 of the temporary storage server 300 for storing the image data img2. The job ID jid2 may be "002", for example. The job ID jid2 is an example of "first information". The image data img2 is an example of "original image data".

In T28 the mediation server 200 updates the job table 229. Specifically, the mediation server 200 stores the model name mn2 received in T20 in the job table 229 in association with the job ID jid2 received in T24.

In T30 the mediation server 200 transmits a response res2 to the MFP 100A in response to the upload screen acquisition request req2. The response res2 includes the upload screen data indicating the upload screen SC1. The upload screen data includes a confirmation URL that the MFP 100A will need to transmit a storage confirmation request req8 to the mediation server 200 in T60 described later, a QR code URL specifying the storage location in which a QR code qr2 is to be stored, and codes for displaying a code image QRIMG1, a message MS1, and a button BT1. The job ID jid2 is also included in both the confirmation URL and the QR code URL. In the present embodiment, the code image QRIMG1 to be displayed in the upload screen SC1 is represented by the QR code qr2. The QR code qr2 is an encoding of an upload page URL that includes the job ID jid2.

After transmitting the response res2, in T32 the mediation server 200 generates the QR code qr2 described above and stores the generated QR code qr2 at the storage location, specified by the QR code URL transmitted to the MFP 100A, in the memory 224.

In T34 the MFP 100A transmits a QR code acquisition request req4 to the mediation server 200 using the QR code URL received in T30. The QR code acquisition request req4 is a request to acquire the QR code qr2.

In T36 the mediation server 200 transmits a response res4 to the MFP 100A. The response res4 includes the QR code qr2. Upon receiving the response res4, the MFP 100A can display the upload screen SC1 including the code image QRIMG1 on the display 130.

In T38 the MFP 100A displays the above-described upload screen SC1 on the display 130.

In T40 the user reads the code image QRIMG1 in the upload screen SC1 displayed on the display 130 using the reader 440 of the mobile terminal 400. Through this operation, the mobile terminal 400 acquires the QR code qr2.

In T41 the mobile terminal 400 interprets the QR code qr2 to acquire the upload page URL that includes the job ID jid2.

In T42 the mobile terminal 400 transmits an upload page acquisition request req5 to the mediation server 200 using the upload page URL. More specifically, the mobile terminal 400 references the upload page URL to identify the mediation server 200 storing the upload page data 230. The mobile terminal 400 transmits the job ID jid2 to the mediation server 200 identified from the upload page URL.

In T44 the mediation server 200 extracts the formats of the image data that the MFP 100A can interpret. Specifically, first the mediation server 200 extracts, from the job table 229, the model name mn2 associated with the job ID jid2 that was included in the upload page acquisition request req5. Next, the mediation server 200 extracts the formats associated with the model name mn2 from the machine information table 228. In the present embodiment, the only format associated with the model name mn2 is the JPEG format.

In T46 the mediation server 200 transmits a response res5 to the mobile terminal 400 in response to the upload page acquisition request req5. The response res5 includes the upload page data 230. Here, the upload page data 230 is based on the extracted formats (the formats that the MFP 100A can interpret) and the formats the temporary storage server 300 can interpret. In other words, the upload page data 230 reflects the extracted formats and the formats supported by the temporary storage server 300. Thus, unlike in the first embodiment, even when an image data which the user desires to print is not in a format that the MFP 100A can interpret, provided that the desired image data is in a format that the temporary storage server 300 can interpret, the user can select the desired image data in the upload page.

In T48 the mobile terminal 400 displays the upload page on the display 430.

In T50 the mobile terminal 400 acquires an upload command to upload the image data img2. More specifically, first the user presses the button BT111 in the page PG11 (see FIG. 5A). As a result, the mobile terminal 400 displays the page PG12 in place of the page PG11. In the following description, it will be assumed that the user has pressed the BT122 in the page PG12.

FIG. 5F illustrates the page PG16 that is displayed when the user presses the button BT122. The page PG16 is a page for selecting image data in the PDF format. Buttons are displayed in the page PG16 with the filenames of all image data files in the PDF format that are stored in the memory 424. In the present embodiment, it will be assumed that the image data img2 having the filename "ccc.pdf" and image data img22 having the filename "ddd.pdf" are stored in the memory 424. Accordingly, a button BT161 indicating the filename of the image data img2, and a button BT162 indicating the filename of the image data img22 are displayed in the page PG16. The user presses, among the buttons displayed in the page PG16, the button indicating the filename of image data that the user wishes to print.

When the user presses one of the buttons BT161 and BT162, the mobile terminal 400 displays a page PG17 in place of the page PG16. The following description will assume that the user has pressed the button BT161 in the page PG16.

FIG. 5G illustrates the page PG17 displayed in response to the user pressing the button BT161. The page PG17 is a page for transmitting the selected image data. The page PG17 includes the button BT111, the button BT112, and the filename for the selected image data img2 (ccc.pdf). In order to print the image data having the displayed filename, the user presses the button BT112. At this time, the mobile terminal 400 acquires an upload command for uploading the image data img2 in the PDF format to the temporary storage server 300 (T50). In this way, the mediation server 200 can prompt the user to select, on the mobile terminal 400, the image data img2 in a format that is not supported by the MFP 100A. Here, the user can also press the button BT111 in order to change the selected image data. If the user presses the button BT111, the mobile terminal 400 again displays the page PG12 in place of the page PG17. Each of the pages PG11 through PG17 is an example of a "selection screen".

In T51 the mobile terminal 400 transmits an upload request req6 to the mediation server 200 in response to the user pressing the button BT112 in the page PG17. The upload request req6 is transmitted to the mediation server 200 for requesting to store the image data img2 on the temporary storage server 300. The upload request req6 includes the image data img2, and the job ID jid2.

In T52 the mediation server 200 generates a URL2. FIG. 6B illustrates URLs used in the second embodiment.

The URL2 is indicated as the upload destination in FIG. 6B. The URL2 includes a parameter xxx identifying the temporary storage server 300, a parameter yyy identifying the memory 324, and a parameter jid=002 identifying a storage location in the memory 324 for storing the image data img2. The portion of the URL2 including the character string "https://xxx/yyy/?jid=" is pre-stored on the mediation server 200. Thus, the mediation server 200 generates the URL2 by appending the character string for the job ID jid2 received in T51 (i.e., 002) to the end of the above pre-stored character string.

In T53 the mediation server 200 transmits an upload request req7 to the temporary storage server 300 using the URL2. The upload request req7 includes the image data img2 and the job ID jid2. More specifically, the mediation server 200 references the parameter xxx in the URL2 to identify the temporary storage server 300 as the transmission destination for the image data img2. The mediation server 200 transmits the parameters yyy and jid=002 and the image data img2 to the temporary storage server 300 identified by the parameter xxx.

In T54 the temporary storage server 300 stores the image data img2. More specifically, the temporary storage server 300 stores the image data img2 in the memory 324 specified by the parameter yyy, at the storage location specified by the parameter jid=002. The storage location at which the image data img1 is stored is an example of a "first storage location".

In T55 the temporary storage server 300 transmits a response res7 to the mobile terminal 400 in response to the upload request req7. The response res7 includes information indicating that the image data img2 was successfully uploaded to the temporary storage server 300.

The process from T56 to T58 is identical to that described in the first embodiment and, hence, a description of this process will not be repeated.

In T60 the MFP 100A transmits a storage confirmation request req8 to the mediation server 200 using the confirmation URL. The storage confirmation request req8 requests the mediation server 200 to confirm whether the image data img2 is stored on the temporary storage server 300. The storage confirmation request req8 includes the job ID jid2. As described earlier, the job ID jid2 is included in the confirmation URL.

In T62 the mediation server 200 transmits a storage confirmation request req9 to the temporary storage server 300. The storage confirmation request req9 is a request for confirming that the image data img2 is stored on the temporary storage server 300. The storage confirmation request req9 includes the job ID jid2 acquired from the storage confirmation request req8.

In T64 the temporary storage server 300 transmits a response res9 to the mediation server 200 in response to the storage confirmation request req9. The response res9 includes the filename of the image data img2 (ccc.pdf) identified by the job ID jid2 included in the storage confirmation request req9.

In T100 the mediation server 200 determines whether the image data img2 identified by the job ID jid2 should be converted. Specifically, the mediation server 200 first identifies the format of the image data img2 from the extension of the filename included in the response res9 (ccc.pdf). In the present embodiment, the mediation server 200 identifies the format of the image data img2 to be PDF since the extension of the filename (ccc.pdf) is "pdf".

Next, the mediation server 200 determines whether the identified format is one of the formats extracted in T44. If the identified format is included in the formats extracted in T44 (i.e., if the identified format is one of the formats extracted in T44), then the MFP 100A is capable of interpreting the image data in the user-designated format. Accordingly, the mediation server 200 determines not to convert the image data img2. However, if the identified format is not included in the formats extracted in T44 (i.e., if the identified format is not one of the formats extracted in T44), the MFP 100A is incapable of interpreting the image data in the user-designated format. Accordingly, the mediation server 200 determines that it is necessary to convert the image data img2. In the present embodiment, the mediation server 200 identifies the format of the image data img2 to be PDF, while the format JPEG was extracted in T44. Since PDF is not included in the formats extracted in T44, the mediation server 200 determines that the image data img2 must be converted.

In T101 the mediation server 200 transmits a conversion request req31 to the temporary storage server 300. The conversion request req31 is a request for the temporary storage server 300 to convert the image data img2 in the PDF format to image data img3 in the JPEG format. The conversion request req31 includes the job ID jid2 associated with the image data img2, and a designation for the converted format (JPEG).

In T102 the temporary storage server 300 transmits a response res31 to the mediation server 200. The response res31 includes a job ID jid3. The job ID jid3 is identification information identifying the image data img3, and identification information identifying a storage location in the memory 324 of the temporary storage server 300 for storing the image data img3.

In T104 the temporary storage server 300 extracts the image data img2 corresponding to the job ID jid2 received in T101 and converts the format of the image data img2 to from PDF to JPEG, thereby generating the image data img3 having the PDF format. Subsequently, the temporary storage server 300 stores the generated image data img3 at the storage location, specified by the job ID jid3, in the memory 324. Accordingly, the management system 6 can convert the image data img2 received from the mobile terminal 400 to image data img3 and can transmit the image data img3 to the MFP 100A. The storage location at which the image data img3 is stored is an example of a "second storage location".

The process from T66 to T70 is identical to that described in the first embodiment and will not be repeated here. Note that since the format designated for the converted image data in T101 is the JPEG format, in T66 the item information included in the response res8 is based on the JPEG format.

In T72 the MFP 100A transmits a settings confirmation request req10 to the mediation server 200. The settings confirmation request req10 requests that the mediation server 200 confirm the settings information indicated by the settings code cd1. The settings confirmation request req10 includes the settings code cd1 and the job ID jid3.

In response to determining in T100 that the image data img2 should be converted, the mediation server 200 transmits a conversion confirmation request req32 to the temporary storage server 300 in T106. The conversion confirmation request req32 is a request to confirm that conversion of the image data img2 to image data 3 was completed.

In T108 the temporary storage server 300 transmits a response res32 to the mediation server 200. The response res32 includes information indicating that conversion of image data img2 to image data img3 was completed. If the conversion was not completed, the response res32 includes information indicating that the conversion of the image data img2 to the image data img3 was not completed. In the latter case, the mediation server 200 retransmits the conversion confirmation request req32 after a fixed interval has elapsed. The mediation server 200 advances to T74 upon receiving a response res32 that includes information indicating that conversion of the image data img2 was completed.

The process in T74 is identical to that in the first embodiment and, hence, a description of the process will not be repeated here.

In T76 the MFP 100A transmits a URL acquisition request req11 to the mediation server 200. The URL acquisition request req11 is a request to acquire, from the mediation server 200, a URL specifying the download source for the image data img3. The URL acquisition request req11 includes the job ID jid3. Since the image data img2 has been converted to the image data img3 in this embodiment, the URL specifying the download source for the image data img3 is a URL3, as indicated in FIG. 6B. The job ID jid3 is an example of "second information". The URL3 is an example of "second information". The image data img3 is an example of "target image data".

In response to determining in T100 that the image data img2 should be converted, the mediation server 200 generates the URL3 in T110. The method of generating the URL3 is identical to the method of generating the URL1 described in the first embodiment.

In T78 the mediation server 200 transmits a response res11 to the MFP 100A in response to the URL acquisition request req11. The response res11 includes the URL3.

In T80 the MFP 100A transmits an image data acquisition request req12 to the temporary storage server 300 using the URL3. The image data acquisition request req12 includes the job ID jid3. More specifically, the MFP 100A first identifies the temporary storage server 300 storing the image data img3 by referencing parameter xxx in the URL3. Next, the MFP 100A transmits the parameters yyy and jid=003 to the temporary storage server 300 identified by parameter xxx.

In T82 the temporary storage server 300 transmits a response res12 to the MFP 100A in response to the image data acquisition request req12. The response res12 includes the image data img3. Here, the temporary storage server 300 identifies the image data img3 stored in the corresponding storage location of the memory 324 based on the parameters yyy and jid=003 received in T76.

In T84 the MFP 100A prints the image data img3 in color and at A4 size based on the settings information st1.

[Third Embodiment]

In the first embodiment described above, the mobile terminal 400 acquires the upload page URL by reading the code image QRIMG1 represented by the QR code qr1 from the MFP 100. In the third embodiment, the mobile terminal 400 may also acquire the upload page URL from the MFP 100 using NFC. In other words, the mobile terminal 400 can acquire the upload page URL either by reading the code image QRIMG1 or by using NFC.

The communication system 2B according to the third embodiment includes the MFP 100, the mobile terminal 400, and the management system 6. The management system 6 includes the mediation server 200 and temporary storage server 300. The MFP 100, mediation server 200, temporary storage server 300, and mobile terminal 400 have the same configurations as those in the first embodiment.

[Operations of the Communication System 2B]

Figure 10:
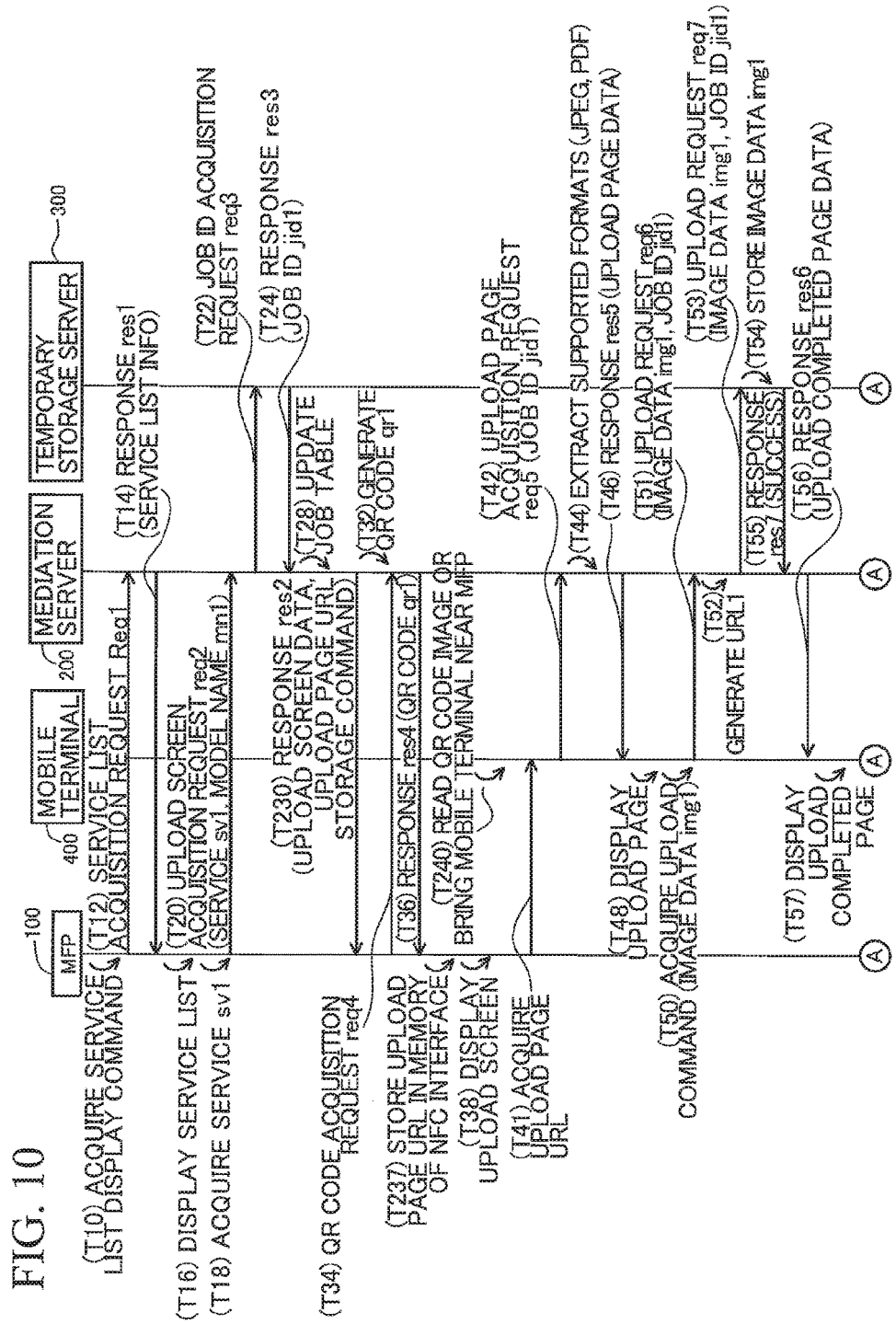
FIG. 10 is a sequence chart illustrating steps in processes performed on the communication system according to the third embodiment.

Next, processes performed on the communication system 2B according to the third embodiment will be described with reference to FIGS. 10 and 3. FIGS. 10 and 3 are sequence charts illustrating steps in the processes performed on the communication system 2B according to the third embodiment.

The process from T10 to T28 is identical to that in the first embodiment and, hence, a description of this process will not be repeated.

In T230 the mediation server 200 transmits a response res2 to the MFP 100 in response to the upload screen acquisition request req2. The response res2 includes upload screen data specifying an upload screen SC2, and an upload page URL storage command. The upload screen data includes a confirmation URL, a QR code URL, and codes for displaying the code image QRIMG1, a message MS2, and the button BT1. The upload page URL storage command is an instruction for the MFP 100 to store an upload page URL in memory provided in the NFC interface 150.

The process from T32 to T36 is identical to that in the first embodiment and, hence, a description of this process will not be repeated.

In T237 the MFP 100 stores the upload page URL in the memory of the NFC interface 150. Accordingly, when a terminal apparatus possessing an NFC interface is brought near the MFP 100, the MFP 100 can transmit the upload page URL to the terminal apparatus using NFC.

In T38 the MFP 100 displays the upload screen SC2 on the display 130. The upload screen SC2 illustrated in FIG. 4B is used in the third embodiment. The upload screen SC2 includes the code image QRIMG1, the message MS2, and the button BT1. The message MS2 prompts the user to read the code image QRIMG1 displayed in the upload screen SC2 using the mobile terminal 400 or to bring the mobile terminal 400 near the MFP 100. By either reading the code image QRIMG1 with the mobile terminal 400 or bringing the mobile terminal 400 near the MFP 100, the user can use the mobile terminal 400 to acquire an upload page URL that includes the job ID jid1.

In T240 the user reads the code image QRIMG1 displayed in the upload screen SC2 on the display 130 using the reader 440 of the mobile terminal 400. This enables the mobile terminal 400 to acquire the QR code qr1. Alternatively, the user may bring the mobile terminal 400 near the MFP 100.

In T41 the mobile terminal 400 acquires the upload page URL that includes job ID jid1. More specifically, when a QR code qr1 was acquired in T240, the mobile terminal 400 interprets the QR code qr1 to acquire the upload page URL. On the other hand, if the user placed the mobile terminal 400 in proximity to the MFP 100, the mobile terminal 400 acquires the upload page URL through NFC with the MFP 100.

The process from T42 to T84 is identical to that in the first embodiment and, hence, a description of this process will not be repeated.

In the first and third embodiments described above, the management system 6 transmits the image data img1 received from the mobile terminal 400 to the MFP 100 in response to a request for the image data img1 received from the MFP 100 with the job ID jid1. In other words, in order to receive the image data img1, the MFP 100 receives the job ID jid1 from the management system 6 and subsequently issues a request for the image data img1 to the management system 6 using the job ID jid1. Accordingly, even when the MFP 100 does not store device-specific information identifying itself, the MFP 100 can suitably execute an image process based on an image data img1 that the mobile terminal 400 has transmitted to the management system 6.

In the second embodiment, the management system 6 transmits the image data img3, which was converted from the image data img2 received from the mobile terminal 400, to the MFP 100A in response to a request for the image data img3 issued by the MFP 100A together with the job ID jid3. In other words, in order to receive the image data img3, the MFP 100A first receives the job ID jid3 from the management system 6, and subsequently issues a request for the image data img3 to the management system 6 using the job ID jid3. Accordingly, even when the MFP 100A does not store any device specific information identifying itself, the MFP 100A can suitably execute an image process based on an image data img2 that the mobile terminal 400 has transmitted to the management system 6.

In the first through third embodiments described above, the user can use a printing service with the MFPs 100 and 100A when the vendor has installed a program on the management system 6, the program supporting this printing service. In this way, the user can use new printing services with MFPs 100 and 100A that have already been shipped from the factory, provided that the vendor updates the program installed on the management system 6 to support these new printing services. Hence, a user does not need to update the programs installed on the MFPs 100 and 100A in order to use new printing services. Accordingly, enhanced convenience for the user can be obtained.

While the description has been made in detail with reference to specific embodiments, it would be apparent to those skilled in the art that various changes and modifications may be made therein.

Further, the control method and computer program used to implement the various functions of the management system and image-processing apparatus of the present disclosure, as well as the computer-readable storage medium for storing the computer program, are novel and useful.

[First Variation]

In the first through third embodiments described above, the communication systems 2 and 2B include the MFP 100 and the communication system 2A includes the MFP 100A. However, the communication systems 2 and 2B may be provided with a printer in place of the MFP 100 and the communication system 2A may be provided with a printer in place of the MFP 100A. That is, the management system should transmit target image data to an image-processing apparatus.

[Second Variation]

In the first through third embodiments described above, the communication systems 2, 2A, and 2B include the mediation server 200 and temporary storage server 300. However, the temporary storage server 300 may be eliminated from the communication system 2, 2A, and 2B, provided that the mediation server 200 possesses the functions of the temporary storage server 300.

In this case, the processes performed in T22, T24, T52, T53, and T55 of FIG. 2 are omitted. Further, in T54 the mediation server 200 stores the image data img1 in the memory 224. Additionally, T62 and T64 of FIG. 3 are not executed. Further, in T80 the MFP 100 transmits the image data acquisition request req12 to the mediation server 200. These modifications are similar for FIGS. 8 and 10, but the processes in T101, T102, T106, and T108 of FIG. 8 are also not executed. Further, in T104 the mediation server 200 converts the image data img2 to the image data img3. That is, the management system should be able to communicate with both an image-processing apparatus and terminal apparatus.

[Third Variation]

In the first through third embodiments described above, the mediation server 200 receives a job ID from the temporary storage server 300 in T24, generates a URL in T52, and transmits the upload request req7 to the temporary storage server 300 in T53 based on this URL. However, the mediation server 200 may instead receive the URL from the temporary storage server 300 in T24, and transmit the upload request req7 to the temporary storage server 300 in T53 based on this URL. In this case, in T24 the mediation server 200 both receives the URL and identifies the job ID based on this URL. In T28 the mediation server 200 stores the job ID identified in T24 in the job table 229 in association with the model name received in T20. In T30 the mediation server 200 transmits upload screen data including the confirmation URL and QR code URL containing the identified job ID to the MFP 100 or 100A. That is, the management system should transmit original image identification information (first information) related to an original image storage location (first storage location) in the image data storage for storing the original image data to the image-processing apparatus.

[Fourth Variation]

In the first through third embodiments described above, in T42 the mediation server 200 receives the upload page acquisition request req5 containing a job ID from the mobile terminal 400, and in T44 extracts the formats of image data supported by the MFP 100 from the machine information table 228 and job table 229 based on this job ID. However, as an alternative, the mediation server 200 may receive the model name of the MFP 100 or 100A from the mobile terminal 400 in T42 and may extract the formats of image data supported by the MFP 100 or 100A from the machine information table 228 based on this model name in T44.

In this case, the MFP 100 or 100A transmits its model name to the mobile terminal 400 in T41. In T44 the mediation server 200 extracts the formats of image data supported by the MFP 100 or 100A based on this model name, and in T46 transmits the upload page data 230 to the mobile terminal 400 based on the extracted formats. In T51 the mobile terminal 400 transmits the upload request req6 to the mediation server 200 for uploading the image data selected in the upload page. That is, the management system should be configured such that the terminal apparatus transmits original image data stored on the terminal apparatus itself to the management system when the terminal apparatus accesses the management system using original image identification information (first information).

[Fifth Variation]

In the third embodiment described above, the MFP 100 enables the mobile terminal 400 to acquire an upload page URL from a QR code qr1 or through NFC. However, the MFP 100 may instead allow the mobile terminal 400 to acquire an upload page URL including the job ID jid1 through NFC alone.

In this case, the upload screen data included in the response res2 transmitted in T230 of FIG. 10 does not include the QR code URL or a code for displaying the code image QRIMG1. Further, the message MS2 only prompts the user to place the mobile terminal 400 near the MFP 100. Once the user brings the mobile terminal 400 near the MFP 100, the mobile terminal 400 can acquire an upload page URL that includes the job ID jid1. In addition, the process from T32 to T36 is omitted. That is, the image-processing apparatus should supply original image identification information (first information) to the terminal apparatus.

[Sixth Variation]

The processes in the embodiments described above are implemented by the CPU 122 of the MFP 100, the CPU 222 of the mediation server 200, and the CPU 322 of the temporary storage server 300 executing process in software (i.e., the programs 126, 226, and 326, respectively), but these processes may be implemented in hardware, such as logic circuits.

What is claimed is:

1. A printer comprising:
a communication interface;
a print device; and
a controller capable of communicating with a management system via the communication interface, the controller being configured to perform:
transmitting a first request to the management system, the first request requesting to transmit first information specifying a first storage location in an image data storage, the first storage location being for storing original image data;
after receiving the first information from the management system, setting the received first information to an obtainable state in which the received first information is obtainable by a terminal apparatus;
after performing the setting, transmitting a second request to the management system, the second request requesting to transmit target image data, the target image data being based on the original image data that is transmitted to the management system from the terminal apparatus and then is stored at the first storage location specified by the first information; and
after receiving the target image data from the management system, controlling the print device to print a target image represented by the received target image data.

2. The printer according to claim 1, wherein the controller is configured to further perform:
after performing the setting and prior to performing the transmitting the second request, transmitting a third request to the management system, the third request requesting to transmit second information, the second information specifying a second storage location in the image data storage, the second storage location being for storing the target image data, and
wherein, after receiving the second information from the management system, the transmitting the second request is performed using the received second information.

3. The printer according to claim 2, wherein the target image data is the same as the original image data, and the second storage location is the same as the first storage location.

4. The printer according to claim 1, further comprising a display,
wherein the receiving the first information is performed by receiving code data including the first information, the code data representing a code image indicating the first information, and
wherein the setting is performed by displaying the code image on the display.

5. The printer according to claim 1, further comprising an interface different from the communication interface,
wherein, in the obtainable state, the first information is obtainable via the interface by the terminal apparatus.

6. The printer according to claim 5, wherein the interface is for establishing a communication with the terminal apparatus using Near Field Communication.

7. The printer according to claim 1, wherein the controller is configured to further perform:
prior to performing the transmitting the second request, transmitting a third request to the management system, the third request requesting to confirm whether or not the target image data is stored in the image data storage, and wherein, when the target image data is stored in the image data storage, the receiving the target image data is performed after performing the transmitting the second request.

8. The printer according to claim 7, further comprising a user interface,
wherein the controller is further capable of receiving a user instruction via the user interface,
wherein, in response to receiving the user instruction after performing the setting, the transmitting the third request is performed.

9. A non-transitory computer readable storage medium storing a set of program instructions for a printer,
the printer comprising:
a processor;
a print device; and
a communication interface, the printer being capable of communicating with a management system using the communication interface,
the set of program instructions, when executed by the processor, causing the printer to perform:
transmitting a first request to the management system, the first request requesting to transmit first information specifying a first storage location in an image data storage, the first storage location being for storing original image data;
after receiving the first information from the management system, setting the received first information to an obtainable state in which the received first information is obtainable by a terminal apparatus;
after performing the setting, transmitting a second request to the management system, the second request requesting to transmit target image data, the target image data being based on the original image data that is transmitted to the management system from the terminal apparatus and then is stored at the first storage location specified by the first information; and
after receiving the target image data from the management system, printing using the print device a target image represented by the received target image data.

10. The non-transitory computer readable storage medium according to claim 9, wherein the set of program instructions, when executed by the processor, causes the printer to further perform:
after performing the setting and prior to performing the transmitting the second request, transmitting a third request to the management system, the third request requesting to transmit second information, the second information specifying a second storage location in the image data storage, the second storage location being for storing the target image data, and
wherein, after receiving the second information from the management system, the transmitting the second request is performed using the received second information.

11. The non-transitory computer readable storage medium according to claim 10, wherein the target image data is the same as the original image data, and the second storage location is the same as the first storage location.

12. The non-transitory computer readable storage medium according to claim 9, wherein the printer further comprises a display,
wherein the receiving the first information is performed by receiving code data including the first information, the code data representing a code image indicating the first information, and
wherein the setting is performed by displaying the code image on the display.

13. The non-transitory computer readable storage medium according to claim 9, wherein the printer further comprises an interface different from the communication interface, and
wherein, in the obtainable state, the first information is obtainable via the interface by the terminal apparatus.

14. The non-transitory computer readable storage medium according to claim 13, wherein the interface is for establishing a communication with the terminal apparatus using Near Field Communication.

15. The non-transitory computer readable storage medium according to claim 9, wherein the set of program instructions, when executed by the processor, causes the printer to further perform:
prior to performing the transmitting the second request, transmitting a third request to the management system, the third request requesting to confirm whether or not the target image data is stored in the image data storage, and
wherein, when the target image data is stored in the image data storage, the receiving the target image data is performed after performing the transmitting the second request.

16. The non-transitory computer readable storage medium according to claim 15, wherein the printer further comprises a user interface and is further capable of receiving a user instruction via the user interface, and
wherein, in response to receiving the user instruction after performing the setting, the transmitting the third request is performed.

* * * * *